*INVENTOR.*
JOSEPH FEINSTEIN
BY
ATTORNEY

April 2, 1968 J. FEINSTEIN 3,376,463
CROSSED FIELD MICROWAVE TUBE HAVING TOROIDAL HELICAL SLOW
WAVE STRUCTURE FORMED BY A PLURALITY OF SPACED SLOTS
Filed Oct. 26, 1964 2 Sheets-Sheet 2

*INVENTOR.*
JOSEPH FEINSTEIN
BY
*Harry E. Aine*
ATTORNEY

United States Patent Office 3,376,463
Patented Apr. 2, 1968

3,376,463
CROSSED FIELD MICROWAVE TUBE HAVING TOROIDAL HELICAL SLOW WAVE STRUCTURE FORMED BY A PLURALITY OF SPACED SLOTS
Joseph Feinstein, Livingston, N.J., assignor to S-F-D Laboratories, Inc., Union, N.J., a corporation of New Jersey
Filed Oct. 26, 1964, Ser. No. 406,305
8 Claims. (Cl. 315—3.5)

ABSTRACT OF THE DISCLOSURE

A microwave crossed-field tube of circular geometry is disclosed. The tube employs a circular helical slow wave structure formed by a metallic toroid slotted in such a manner as to form the helix. More specifically, the metallic toroid is slotted with a first array of radially directed slots passing partially through the cross-section of the toroid. A second array of peripherally spaced slots are provided which are inclined to the direction of the first slots, such inclined slots passing through the remaining cross-sectional portion of the toroidal member and interconnecting adjacent ones of the first array of slots to define the helix slow wave structure. In a preferred embodiment, the toroid is of rectangular cross-section and a pair of thermally conductive dielectric members support the toroid from the envelope of the tube and are affixed to the helix at opposed axial ends thereof.

---

Heretofore circular crossed field transmitter tubes have been built using a wound wire helix as the slow wave circuit, see U.S. Patent 2,531,972 issued to Q. Doehler et al. on Nov. 28, 1950. However, such tubes have been relatively unsatisfactory because the wire wound helix geometry, when ruggedly constructed for heat dissipation, does not readily lend itself to an arcuate physical configuration.

As a consequence the helix could not be formed into a circular shape with the required precision to retain the desirable broad band and physically rugged characteristics required of present day high power, broad band tubes.

In a preferred embodiment of the present invention an arcuate, physically rugged, relatively high thermal capacity, helical slow wave circuit is provided. The improved circuit is preferably formed by first making a toroidal shaped precision tube of rectangular cross-section and of relatively rugged construction and relatively high thermal capacity material such as molybdenum. The toroidal shaped tube is then slotted by an array of radial slots which cut through the inside diameter of the toroid and two additional sides of the tube leaving one uncut side of the toroid. The uncut side of the toroid is then slotted with an array of diagonal cuts which interconnect adjacent radial slots. The toroidal tube thus slotted forms a helix which, in a preferred embodiment, is supported via dielectric heat conductive slabs in coaxial surrounding relationship to a cylindrical cathode emitter of a magnetron type tube. Crossed field tubes using the helix of the present invention are capable of providing many kilowatts of average power over octaves of bandwidth.

The principal object of the present invention is the provision of a crossed field tube utilizing a helix circuit and having increased power output and bandwidth.

One feature of the present invention is the provision of an improved arcuate helix slow wave circuit formed by a slotted toroidal tube having a flat side for interaction with a stream of electrons and wherein the slots comprise a first radial array of slots cutting through the flat side and a preponderance of the remaining cross-section of the tube and including a diagonal array of slots interconnecting adjacent ones of said first array of slots, whereby a rugged precise helix of circular direction is formed.

Other features and advantages of the present invention will become apparent upon a perusal of the following specification taken in connection with the accompanying drawings wherein.

Figure 1:
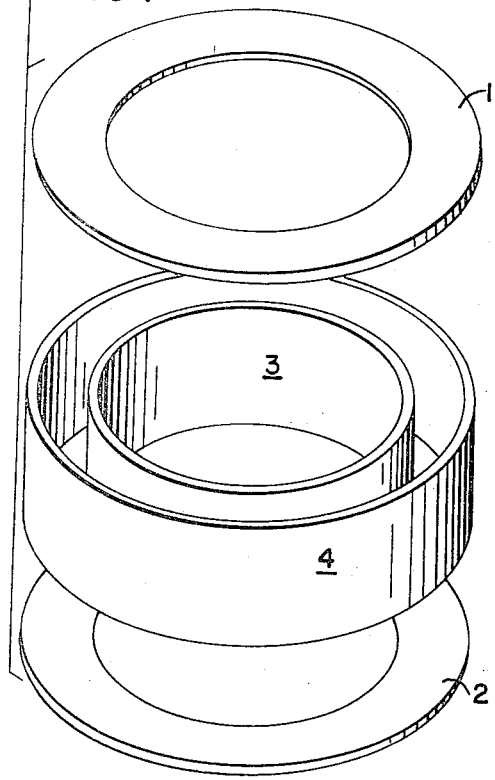
FIG. 1 is an exploded perspective piece part drawing showing certain of the fabrication steps for the helical slow wave circuit blank of the present invention.
Figure 3:
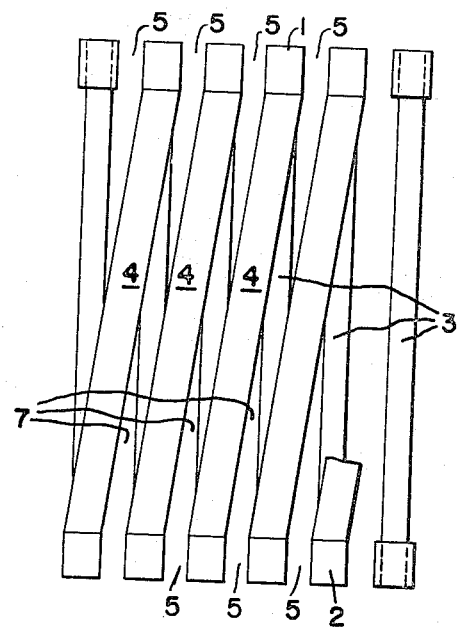
FIG. 3 is an enlarged fragmentary side elevational view of the circuit blank of FIG. 2 taken along line 3—3 in the direction of the arrows and illustrating the diagonal slotting of the circuit blank.

Referring now to FIG. 1, there is shown, in exploded view, the slow wave circuit blank. In manufacture of the slow wave circuit, a metallic toroid tube of rectangular cross-section is formed preferably by brazing a pair of annular metallic plates 1 and 2 over the opposite ends of a pair of metallic coaxial, axially coextensive, cylinders 3 and 4, respectively. In a preferred embodiment the toroid is made of a high thermal capacity material such as, for example, molybdenum, copper, aluminum or stainless steel to readily permit thermal conduction to a suitable heat sink without losing its physical strength.

Figure 2:
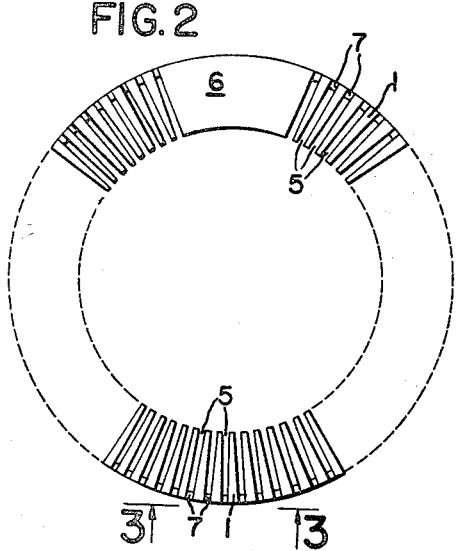
FIG. 2 is a plan view of the circuit blank of the present invention illustrating the radial slotting thereof.
Figure 4:
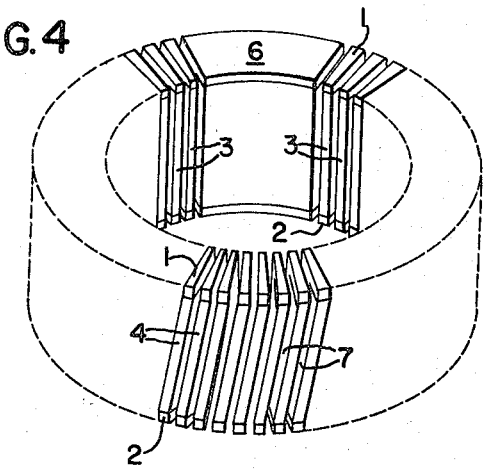
FIG. 4 is a perspective view partly in phantom of the helical slow wave circuit of the present invention.

Once the toroidal blank is formed it is then slotted with an array of radially directed slots 5 (see FIG. 2) which cut through the inner cylinder 3 and preferably the top and bottom plates 1 and 2 but not the outer cylindrical wall 4. A section 6 of the blank is left unslotted thereby forming a sever in the circuit and defining two ends of the circuit.

The outer cylindrical wall 4 of the toroid is then slotted with an array of generally axially directed slots 7. However, the slots are slightly inclined to the axis of the toroid such that the slots 7 interconnect adjacent radial slots 5 at the outer marginal edges of the end plates 1 and 2. As before the sever section 6 of the blank is not slotted with slots 7. The resultant slotted toroid is an arcuate helical slow wave circuit of high precision and strength useful for high power broad band crossed field tubes.

In a typical example of a helix for operation over the frequency band of 200 mc. to 2,000 mc. at an average power output of 5 kw. the circuit would have the following dimensions: cylinders 3 and 4 are of 0.150" wall thickness and of 2.537" and 3.387" outside diameter, respectively, and both of 1.032" in length. The end plates 1 and 2 are of 0.080" thickness. There are fifty-three 0.0625" wide radial slots 5 angularly spaced at 6° intervals of arc thereby defining an artuate circuit encompassing 318° of arc with a circuit sever 6 of 42° of arc. The axial array of slots 7 are 0.0625" in width and are inclined at 10°3' to the axis of the toroid.

Figure 5:
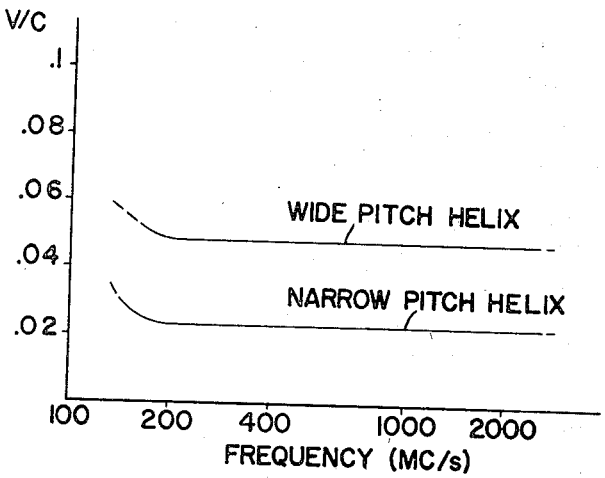
FIG. 5 is a dispersion diagram depicting the wave propagation characteristics of the helical circuit of the present invention.

Typical dispersion curves for the helix circuit, as above described, are as shown in FIG. 5. One curve shows the dispersion characteristic for a relatively wide pitch helix and the other curve is for a narrow pitch helix. Both curves show constant phase velocity from below 200 mc./s. to above 2000 mc./s. The actual phase velocity for the two circuits differs by a factor of two in accordance with elementary theory based upon geometric meander of the propagation path.

While in a preferred embodiment of the present invention the toroid is of rectangular cross-section, this is not a requirement. It is only necessary that the surface of the toroid helix that faces the cathode emitter or stream of electrons be flat for enhanced electronic interaction. The remaining flat sides of the rectangular cross-section helix are particularly advantageous because they readily lend themselves to large area support by thermally conductive dielectric slabs such as boron nitride or beryllium oxide in abutment with the top and bottom flat sides of the helix for cooling thereof. However, these non-interacting sides of the helix need not be flat but may be curved surfaces.

Figure 6:
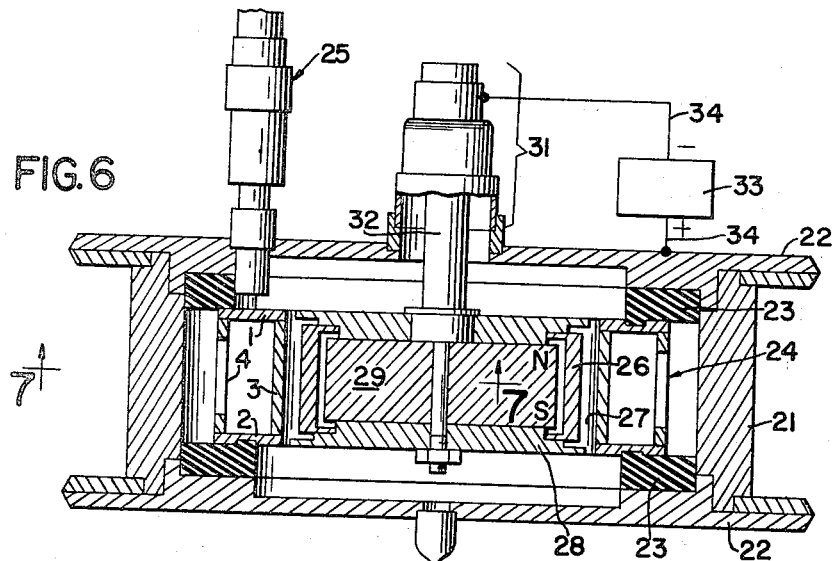
FIG. 6 is a longitudinal sectional view of a tube incorporating the circuit of the present invention.
Figure 7:
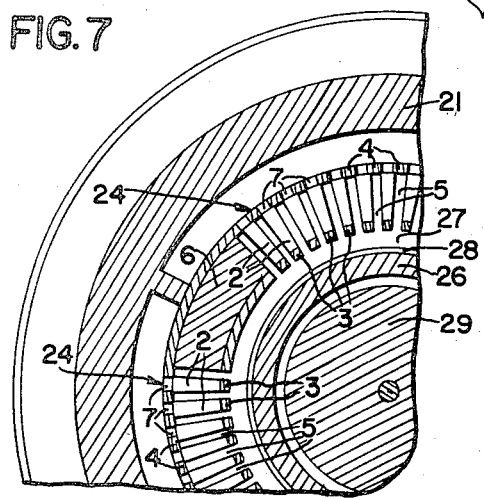
FIG. 7 is a transverse sectional view of the structure of FIG. 6 taken along line 7—7 in the direction of the arrows.

Referring now to FIGS. 6 and 7, there is shown a typical circular type crossed field tube employing the novel helix circuit of the present invention. More particularly, the tube comprises a hollow cylindrical main body member 21, as of copper. A pair of end plates 22, as of copper, close off the ends of the main body 21 in a vacuum tight manner. The toroidal helix slow wave circuit 24, as above described, is coaxially mounted of and within the main body 21 via the intermediary of a pair of thermally conductive annular dielectric plates 23 of boron nitride or beryllium oxide. The dielectric plates 23 serve to sandwich the toroidal helix 24 therebetween and in turn the plates 23 are held in good thermal contact with the end closing plates 22 of the body thereby serving as a good heat sink for the circuit 24.

A hermetically sealed output coaxial line 25 connects into the circuit 24 at the output end thereof thereby forming an output terminal for extraction of output power. Conventional impedance matching techniques, not shown, are employed for matching the coaxial line to the circuit over a broad band of frequencies.

A hollow cylindrical cold cathode emitter electrode structure 26, as of beryllium-copper or aluminum, is coaxially disposed of the helix 24 to define an annular electronic interaction region or gap 27 in the space between the cathode 26 and the helix 24.

A pair of cathode pole pieces 28, as of iron, close off the open ends of the cylindrical cathode emitter 26. The pole pieces 28 also serve as cathode end hats by projecting toward the circuit 24 over the surface of the cathode emitter 26.

A cylindrical permanent magnet 29 is coaxially mounted within the cathode emitter electrode 26. The permanent magnet 29, as of Alnico VIII, is axially magnetized. The magnet 29 is preferably radially spaced away from the inside wall of the emitter 26 to reduce thermal conduction from the cathode 26 to the magnet 29.

The magnet 29 produces an axially directed magnetic field H as of 900 gauss in the annular interaction region 27. The magnetic pole piece and hats serve to improve the uniformity of the axial megnetic field H to reduce unwanted beam interception by the circuit 24.

An axially directed insulated cathode stem assembly 31 serves to support the cathode electrode structure 26 and internal magnet 29 from the end plate 22 of the main body 21. The cathode stem assembly includes a high voltage insulator insulating the center conductor 32 of the stem from the main body potential. A high voltage power supply 33 as of 3 kv. is connected between the center conductor of the cathode stem assembly and the tube's main body and helix 24 via leads 34 for maintaining the helix 24 and body 21 at a high positive potential relative to the cathode electrode 26.

When used as a wide band noise generator, useful for radar jamming, the tube envelope is filled with a suitable gas such as $H_2$, A or Xe at a low pressure as, for example, $10^{-1}$ torr. The gas is employed to start the cold cathode electronic discharge when the tube is operated as a noise generator.

Cold cathode gas filled magnetron oscillators are described in "Crossed-Field Microwave Devices," vol. 2, Okress, pages 301–313 (1961). This mode of operation will be more fully described below. The apparatus may also be operated as an amplifier when evacuated and arranged such as the R.F. drive power is sufficient to start the electron build-up for the cold cathode under high vacuum conditions.

In operation, a cold cathode electrode to anode electrode voltage, as of 3 kv., is applied via power supply 33 and leads 34. The applied D.C. voltage is of sufficient amplitude to cause a breakdown in the gas fill to produce space charge which initiates operation of the tube. Steady state operation occurs due to the secondary emission from the cathode 26. Space charge noise signals present in the interaction gap excite a wave on the helix slow wave circuit 24. The noise wave energy on the circuit is amplified by cumulative electronic interaction with the space charge to produce rotating spokes of space charge rotating with a synchronous velocity corresponding to electron energy matched to the dispersion curve of the circuit. The amplified noise energy over a broad band of frequencies, such as many octaves of bandwidth, is extracted from the circuit 24 via output coaxial line 25 and transmitted to a suitable utilization device, not shown.

The electronic interaction produces electron back bombardment of the cold cathode 26 to produce secondary emission therefrom to replenish the space charge collected on the helix structure 24. The space charge is trapped in equipotentials in the presence of the axial magnetic field and continues to recirculate around the cathode 26 until collected. The sever 6 subtends sufficient arc to produce debunching of the space charge passing through the drift space adjacent the sever 6 thereby preventing electronic feed-back oscillations.

A typical noise generator tube of the above-described type produces noise over several octaves of bandwidth. The tube may also be operated as a conventional two port forward wave amplifier. In this case, the tube would be essentially the same tube as above-described except that the gas fill need not be used, it being replaced by a high vacuum, and except for the provision of an input coaxial line, not shown, identical to line 25. The input line, in this case, is connected to the beginning or input end of the slow wave circuit 24 in the same manner as coaxial line 25. Also, this latter embodiment could be used as a noise generator by resistively terminating the input coaxial line in a matched load and reverting to the gas fill.

In the amplifier case the R.F. signal to be amplified produces sufficient cathode back/bombardment and secondary emission to sustain amplification and power output. In such a tube at L band, substantial gain is obtained over octaves of bandwidth at a power output of multi kw.

The present invention has been described with regard to a particular magnetron type wherein the cold cathode electrode was also the cathode emitter. This is not a requirement of the present invention. The cold cathode electrode, i.e., the electrode structure operating at cathode potential, could be non-emissive and electron emission being supplied entirely from a separate thermionic emitter and injected into the annular electron stream in the conventional manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A crossed-field microwave tube apparatus including, means for producing an arcuate stream of electrons, means forming a toroidal helical slow wave circuit having a cylindrical face disposed adjacent and curving with said stream of electrons for electromagnetic interaction therewith, said slow wave circuit formed by a hollow toroidal tubular member having an array of peripherally spaced radially directed slots passing partially through the cross-section of said toroidal member, and a second array of peripherally spaced slots inclined to the direction of said first slots and passing through the remaining cross-sectional portion of said toroidally shaped tubular member and interconnecting adjacent ones of said first array of slots to define a toroidal helix slow wave structure in the slotted portion of said toroidally shaped tubular member, and means for extracting wave energy from said helical slow wave circuit.

2. The apparatus according to claim 1 including, a pair of thermally conductive dielectric members supporting and heat sinking said toroidal helix from oppositely disposed axially spaced sides thereof.

3. The apparatus according to claim 1 wherein said toroidal shaped helix is of rectangular cross-section.

4. The apparatus according to claim 1 including means for producing a static magnetic field axially of the toroidal helix and wherein the planes defined by said array of radial slots are parallel to the axis of said toroidal circuit and pass through said cylindrical face of said toroidal member whereby the alternating electric fields of the microwave energy traveling between adjacent turns of said helix in the electronic interacting region are normal to the direction of the axially directed static magnetic field whereby efficient cross-field interaction is obtained.

5. A magnetron microwave tube apparatus including; means forming a generally cylindrical cathode electrode structure; means for producing an arcuate stream of electrons adjacent said cathode electrode; means forming an anode electrode structure coaxially disposed of said cathode eletcrode in spaced apart relationship and defining an annular electronic interaction region containing said stream of electrons between said cathode and anode electrodes; said anode electrode structure including a toroidal severed helical slow wave circuit having a cylindrical face facing said cylindrical cathode electrode structure for electronic interaction between waves on said circuit and the arcuate stream of electrons; means for producing a magnetic field in said annular interaction gap with the magnetic field being directed axially of said toroidal helix to cause the electron stream to move tangentially to said helix to effect cumulative electronic interaction between the electron stream and waves on said helix; means for extracting microwave energy from said helix; and said helix being formed by a hollow toroid shaped metallic tubular member with a cylindrical face facing said cathode structure and having an array of angularly spaced radially directed slots which cut partially through the cross-section of said toroid, and including a second array of angularly spaced slots inclined to said first array of slots and cutting through the remaining cross-section of said toroid and interconnecting adjacent ones of said first array of slots to define said toroidal shaped helix.

6. The apparatus according to claim 5 wherein said cathode electrode structure includes a cold cathode emitter and said magnetic field producing means is disposed within said cathode electrode structure whereby the size and weight of the tube apparatus is minimized.

7. The apparatus according to claim 5 wherein said toroid helix is of rectangular cross-section.

8. The apparatus according to claim 7 including a pair of annular thermally conductive dielectric plates disposed against opposite axial spaced sides of said helix for heat sinking same.

References Cited
UNITED STATES PATENTS 2,620,458 12/1952 Spencer ———————— 315—39.3
2,680,811 6/1954 Guenard et al.

HERMAN KARL SAALBACH, *Primary Examiner.*
ELI LIEBERMAN, *Examiner.*
P. L. GENSLER, *Assistant Examiner.*